Patented July 19, 1927.

1,636,319

UNITED STATES PATENT OFFICE.

EARLE C. PITMAN, OF PARLIN, NEW JERSEY, ASSIGNOR TO E. I. DU PONT DE NEMOURS & COMPANY, OF WILMINGTON, DELAWARE, A CORPORATION OF DELAWARE.

PROCESS OF REDUCING VISCOSITY OF NITROCELLULOSE SOLUTIONS AND PRODUCT THEREOF.

No Drawing. Application filed August 11, 1921. Serial No. 491,596.

This invention relates to a process of reducing the viscosity of nitrocellulose solutions without substantially changing the ratio of nitrocellulose to solvent, and to the product of such process, and it comprises subjecting such solutions to the action of a salt of the character hereinafter described.

While it has been known that viscosity could be made lower by high temperature nitration or by continued boiling of the pyroxylin, both of these methods are expensive and relatively ineffective as compared with my new process.

I have discovered that certain salts, and particularly the acetates of the alkali-forming metals such as sodium acetate and calcium acetate, have a remarkable effect on the viscosity of nitrocellulose (pyroxylin) solutions which have not previously been treated with said salts. Only a small amount, for example 0.1%, of the salt, based upon the weight of the solution, is required to bring about a substantial reduction in viscosity.

The reduction of viscosity according to my invention is effected by incorporating the salt in the nitrocellulose solution to form a homogeneous mixture, and then either allowing the mixture to stand for several days at room temperature, that is, between about 22 and 25° C., or mildly heating the mixture while preventing the escape of solvent.

The new process may be illustrated by the following example:—

A pyroxylin solution is prepared having the following composition:

| | Parts by weight. |
|---|---|
| Pyroxylin | 20 |
| Camphor | 3 |
| Fusel oil | 10 |
| Wood alcohol | 67 |

0.2 parts of sodium acetate are incorporated in the above-described solution, and the mixture is allowed to stand at room temperature (22° C.) for from 1 to 7 days depending upon the viscosity desired.

The proportion of salt used may be varied within wide limits; it will ordinarily be between 0.01% and 4% based upon the weight of the pyroxylin solution.

The pyroxylin solution may be prepared with any of the customary solvents such as ethyl or amyl acetate, acetone, etc. with or without diluents such as benzene, toluene, ethyl alcohol, etc.

Salts which I have found to be particularly efficient in reducing viscosity are the acetates of the alkali metals and of the alkaline earth metals. The corresponding salts of other lower monobasic aliphatic acids are also active viscosity-reducers, as for example, the formates. Salts of simple di- and tri-basic aliphatic acids such as sodium oxalate and sodium citrate exhibit a viscosity-reducing action; but to a less degree than the above mentioned salts of monobasic acids.

In addition to the acetates of alkali metals and alkaline earth metals, the acetates of ammonium, cadmium, cobalt, and zinc have been found to be very effective viscosity-reducers.

The extent of the reduction of viscosity of a nitrocellulose solution after being subjected to the action of a viscosity-reducing agent for various periods is indicated in the following table, giving results of the action at room temperature of 0.2% sodium acetate on pyroxylin solutions containing 12 to 18% pyroxylin, the viscosity being expressed in centipoises at 25° C.

| Period (in days). | Viscosity. | | | |
|---|---|---|---|---|
| Initially | 15,000 cp. | 15,000 cp. | 6,300 cp. | 5,000 cp. |
| 1 | 10,000 cp. | 3,000 cp. | | 1,000 cp. |
| 3 | | | 3,600 cp. | 590 cp. |
| 4 | 5,000 cp. | 1,500 cp. | 3,100 cp. | 400 cp. |
| 7 | 3,500 cp. | 1,100 cp. | | |
| 10 | | | 1,800 cp. | 120 cp. |
| 11 | 2,000 cp. | 1,000 cp. | | |
| 14 | 1,200 cp. | 960 cp. | | |
| 36 | | 920 cp. | | |
| 40 | 1,000 cp. | | | |
| 120 | | | 190 cp. | 20 cp. |
| 150 | 490 cp. | | | |

The invention is not limited to the treatment of pyroxylin solutions with a single salt, but includes the combination of two or more different salts for reducing viscosity. Satisfactory decreases in viscosity may be brought about by such combinations, thereby making possible the incorporation of salts which will advantageously affect the finished nitrocellulose plastic or film.

Instead of allowing the mixture to stand for several days at room temperature, it may be heated at a temperature of, say, from 60 to 80° C., the reduction in viscosity being thereby greatly accelerated. In many cases, however, it is more convenient to simply allow the solution to stand at room temperature until the desired viscosity value has been reached. Ordinarily I prefer to keep the solution at a temperature above 20° C.

The new solutions obtained by the above-described process are characterized by containing from about 0.01 to 4% of a salt of a lower aliphatic acid, and particularly from 0.2% to 1% of an alkali-forming metal acetate, and by having a substantially lower viscosity than a solution having the same nitrocellulose-solvent ratio, but free from a viscosity-reducing substance.

I claim:—

1. The process of reducing the viscosity of a nitrocellulose solution which comprises dissolving therein a soluble salt of a lower, monobasic, aliphatic acid, and allowing the resulting solution to stand until a substantial reduction in viscosity has occurred.

2. The process of reducing the viscosity of a nitrocellulose solution which comprises dissolving therein an alkali-forming metal salt of a lower aliphatic acid, and allowing the resulting solution to stand until a substantial reduction in viscosity has occurred.

3. The process of reducing the viscosity of a nitrocellulose solution which comprises dissolving therein sodium acetate, and allowing the resulting solution to stand until a substantial reduction in viscosity has occurred.

4. The process of reducing the viscosity of a nitrocellulose solution which comprises treating it with from 0.01% to 4% of an alkali-metal salt of a lower, monobasic, aliphatic acid, and allowing the resulting solution to stand at least until a substantial reduction in viscosity has occurred.

5. The process of reducing the viscosity of a nitrocellulose solution which comprises treating it with from 0.2% to 1% of sodium acetate, and allowing the resulting solution to stand at least until a substantial reduction in viscosity has occurred.

6. The process of reducing the viscosity of a nitrocellulose solution which comprises mixing therewith an alkali-forming metal acetate, and allowing the mixture to stand at a temperature above 20° C. until the desired viscosity has developed.

7. The process of reducing the viscosity of a substantially neutral nitrocellulose solution which comprises subjecting the nitrocellulose in said solution to the action of a salt of a lower, monobasic aliphatic acid, and allowing said action to continue at least until a substantial reduction in viscosity has occurred.

8. The process of reducing the viscosity of a substantially neutral nitrocellulose solution which comprises subjecting the nitrocellulose in said solution to the action of an alkali-forming metal salt of a lower aliphatic acid, and allowing said action to continue at least until a substantial reduction in viscosity has occurred.

9. The process of reducing the viscosity of a substantially neutral nitrocellulose solution which comprises subjecting the nitrocellulose in said solution to the action of an alkali-forming metal acetate, and allowing said action to continue at least until a substantial reduction in viscosity has occurred.

10. The process of reducing the viscosity of a substantially neutral nitrocellulose solution which comprises dissolving therein a soluble salt of a lower, monobasic, aliphatic acid, and allowing the resulting solution to stand until a substantial reduction in viscosity has occurred.

11. The process of reducing the viscosity of a substantially neutral nitrocellulose solution which comprises dissolving therein an alkali-forming metal salt of a lower aliphatic acid, and allowing the resulting solution to stand until a substantial reduction in viscosity has occurred.

12. The process of reducing the viscosity of a substantially neutral nitrocellulose solution which comprises subjecting it to the action of from 0.01% to 4% of an alkali-metal salt of a lower, monobasic, aliphatic acid until a substantial reduction in viscosity has occurred.

In testimony whereof I affix my signature.

EARLE C. PITMAN.